Dec. 20, 1966  A. R. WILLMAN  3,292,898
ROTARY VALVE WITH TAPERED SEAT
Filed Dec. 18, 1963
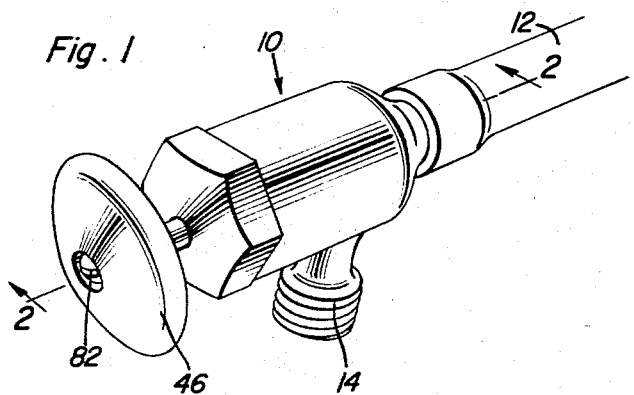
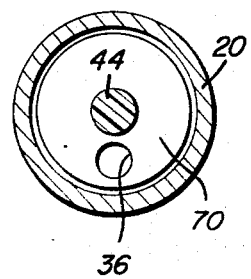
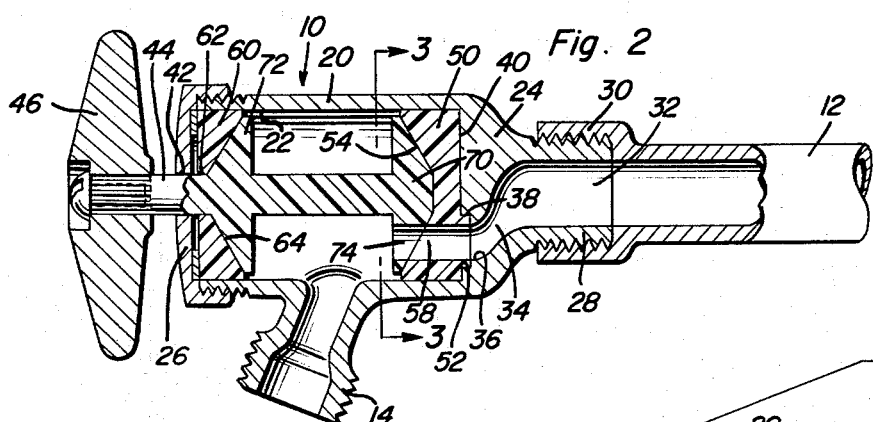
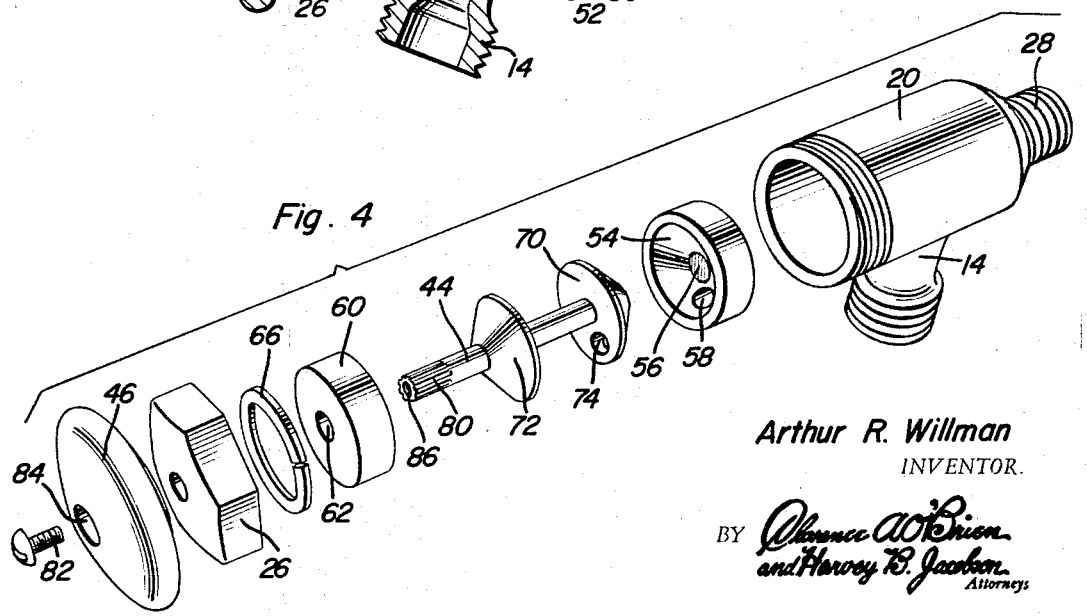
Arthur R. Willman
INVENTOR.

United States Patent Office 3,292,898
Patented Dec. 20, 1966

3,292,898
ROTARY VALVE WITH TAPERED SEAT
Arthur R. Willman, R.R., Fox River Gardens,
Yorkville, Ill. 60560
Filed Dec. 18, 1963, Ser. No. 331,487
7 Claims. (Cl. 251—188)

This invention comprises a novel and useful rotary valve with tapered seat and more particularly pertains to a valve assembly having greatly superior wearing and sealing properties.

It is the primary purpose of this invention to provide a rotary type of valve for controlling fluids of various types and wherein there is provided a greatly superior seating action of the valve upon its seat and a greatly superior sealing of the valve assembly against the leakage of fluid therethrough.

It is a primary object of the invention to provide a simplified construction of a rotary valve assembly whereby single means with adjustable pressure retains the valve on its seat and retains a sealing means in engagement with the valve to prevent the escape of fluid through the valve assembly.

A further object of the invention is to provide a rotary valve assembly in accordance with the preceding object which shall make use of non-metallic long-wearing materials for the valve seat and the sealing means.

A further purpose of the invention is to provide a rotary valve assembly in accordance with the preceding objects which shall be extremely simple and compact in its construction and yet highly efficient for its operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the rotary valve assembly in accordance with this invention;

FIGURE 2 is a view in vertical longitudinal section through the valve assembly of FIGURE 1 and showing the rotary valve in its port open position;

FIGURE 3 is a vertical transverse sectional view taken through the valve assembly substantially upon the plane indicated by the section line 3—3 of FIGURE 2; and, FIGURE 4 is an exploded perspective view of the valve assembly and its components.

In the accompanying drawings, the numeral 10 designates generally the improved valve assembly in accordance with this invention and which, as shown, is connected to a pipe 12 through which a fluid to be controlled by the valve is supplied to the latter, the valve assembly including a discharge spout or faucet 14.

Referring now especially to FIGURE 2 and in conjunction with FIGURE 4 it will be observed that the valve assembly includes a cylindrical valve housing 20 which is provided with a cylindrical valve chamber 22 therein closed at its opposite ends by end walls as at 24 and 26. The end wall 24 is preferably integral with the valve body or housing 20 and is diametrically reduced being externally threaded as at 28 for engagement in the internally threaded female element 30 of the supply pipe 12. The externally threaded portion 28 is tubular being provided with an axial passage as at 32 which is in continuous communication with the pipe 12 at its inlet side. The passage 32 has opening thereinto a laterally offset passage 34 for forming a continuation thereof, which latter passage terminates in an inlet port 36 formed in the bottom of a recess 38 provided in the flat surface 40 of the end wall 24.

The other end wall 26 preferably comprises an internally threaded packing nut or bushing which engages the corresponding externally threaded end portion of the housing 20 to close the latter. This bushing or packing nut is provided with an axial bore 42 therethrough for the reception of a valve stem 44 upon which is disposed the valve control knob 46 manually operated to rotate the valve stem.

Disposed in the chamber 22 are a pair of seat members of a non-metallic material such as neoprene or the like. The seat member 50 snugly engages the side walls of the chamber 22 and the end surface 40 of the chamber end wall 24, it being provided with a tubular projecting nipple as at 52 which is received in the recess 38 previously mentioned. The valve seating member 50 is provided with a conical valve seating surface 54 having a central annular flat surface 56 therein. Disposed eccentrically of the valve seat member 50 is a valve passage 58 therethrough which is in full registration with the valve inlet port 36 previously mentioned.

The other seating member 60 comprises a valve packing and likewise is of neoprene or other suitable material. The member 60 has an axial bore 62 therethrough for the reception of the valve stem 44 and is provided with a conical sealing surface 64. A thrust washer as at 66 is disposed between the sealing member 60 and the packing gland 26.

Received within the valve chamber 22 is the valve member consisting of the previously mentioned stem 44 upon which are provided a pair of reversely facing conical heads as at 70 and 72. The valve head 70 has a surface complementary to the valve seats 54 and 56 to snugly and firmly engage therewith, and is provided with a valve port 74 which upon rotation of the stem is adapted to register with the valve passage 58 through the valve seat 50. The sealing member 72 is likewise provided with a conical surface complementary to that of the sealing member 60 so as to snugly engage therewith. The end of the stem 44 is splined as at 80, and the valve handle 46 is likewise similarly splined for engagement thereon, a fastening screw as at 82 extending through the aperture 84 of the handle 46 into the internally threaded bore 86 at the end of the valve stem.

It will be noted that the act of tightening the packing nut 26 serves the dual functions of pressing the valve head 70 firmly against the seat 54 of the valve seating member 50, thus preventing any escape of fluid therebetween and also serves to apply pressure to the sealing member 60 and presses it firmly into a fluid-tight sealing engagement with the sealing head 72. Thus, when the valve passage 74 is out of registry with the passage 58, no fluid can escape and the valve head 70 is urged to its seat by the pressure applied through the packing gland 26 to the valve sealing member 60 and the sealing head 72.

Inasmuch as metal-to-metal contact of the moving parts is completely eliminated by this invention, the use of neoprene or other synthetic plastics establishes a friction resisting and wear resisting surface of the moving parts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary valve assembly comprising a valve housing having a chamber therein, a valve seat member at one end of said chamber and a valve seal member at the other end of said chamber, a valve inlet port through said valve seat member, an outlet port from said chamber between said members, a valve member rotatably disposed in said chamber and including an axial valve stem, a valve head on one end of said stem having a valve surface complementary to and rotatably engaging said valve seat member and having a valve port therethrough registrable with said valve inlet port, a sealing head on said valve stem complementary to and rotatably engaging said seal member, said stem having a handle thereon exterior of said housing, a packing gland on said housing engaging said seal member and adjustably pressing the latter against said sealing head and said valve head against said valve seat member, said housing having an end wall at one end, said end wall having a circular flat surface comprising one end of said chamber, said surface including a recess receiving a projection upon said valve seat member thereby preventing rotation of the latter, said valve inlet port comprising registering bores in said end wall and in said valve seat member, said registering bore extending through said projection.

2. A rotary valve assembly comprising a valve housing having a chamber therein, a valve seat member at one end of said chamber and a valve seal member at the other end of said chamber, a valve inlet port through said valve seat member, an outlet port from said chamber between said members, a valve member rotatably disposed in said chamber and including an axial valve stem, said valve stem comprising a substantial incompressible member, a valve head on one end of said stem and having a valve surface complementary to and rotatably engaging said valve seat member and having a valve port therethrough registrable with said valve inlet port, a sealing head on said valve stem complementary to and rotatably engaging said seal member, said stem having a handle thereon exterior of said housing, a packing gland on said housing engaging said seal member and adjustably pressing the latter against said sealing head and, due to the substantial incompressibility of said stem, said valve head against said valve seat member.

3. The combination of claim 2 wherein said axial valve stem comprises a one-piece substantially incompressible cylindrical member.

4. A rotary valve assembly comprising a valve housing defining an elongated chamber therein including one end wall and side walls adjacent said one end, a fluid inlet port opening into said chamber through said one end wall, a deformable and peripherally expandable seat member disposed in said chamber against said end wall and with its peripheral edges in juxtaposed relation with said side walls, the side of said seat member remote from said end wall including a generally conical seating surface, a communicating port formed through said seat member and registered with said inlet port and eccentrically disposed relative to said seating surface, a rigid and relatively nondeformable one-piece valve member including an elongated stem and a head portion on one end of said stem including a generally conical seating surface facing in the direction remote from the other end of said stem and complementary to and in juxtaposition with the first mentioned seating surface, said head having a valve port formed therethrough selectively registrable with the end of said communicating port opening through the first mentioned seating surface, said valve member being rotatable in said housing about an axis extending through the center portions of said seating surfaces and generally paralleling said stem to cause selective registry of said valve communicating ports, said valve housing and said valve member, adjacent the other end thereof, including coacting means adjustably defining a minimum spatial relation between the second mentioned conical seating surface and said end wall with said head portion axially compressing said seat member between said end wall and said head and thereby radially expanding said seat member into tight frictional engagement with said side walls, said valve housing including an outlet opening communicated with the interior of said chamber on the side of said head portion remote from said conical seating surfaces.

5. The combination of claim 4 wherein said coacting means comprises first thrust bearing surface means carried by the other end of said stem and facing away from said head and second thrust bearing surface means carried by said housing opposing said first thrust bearing surface means and adjustably positionable toward said one end wall.

6. The combination of claim 4 wherein said housing includes second end wall opposing said first end wall and disposed between said side walls, a second deformable and peripherally expandable seat member disposed in said chamber against said second end wall and with its peripheral edges in juxtaposed relation with said side walls, a second head on said stem abutted against said second seat member, said second head and second seat member including complementary opposing conical seating surfaces, said coacting means comprising said second end wall, said second seat member, and said second head, said second end wall being adjustable toward and away from the first mentioned end wall.

7. The combination of claim 6 wherein said stem includes an extension end portion projecting outwardly of the side of said second head remote from the first mentioned head, said second seat member and said second end wall including aligned bores snugly receiving said extension end portion therethrough.

References Cited by the Examiner

UNITED STATES PATENTS

| 1,176,253 | 3/1916 | Schutt | 251—180 XR |
| 1,315,741 | 9/1919 | Pranold | 251—180 XR |
| 1,451,588 | 4/1923 | Reidt | 251—188 |
| 3,090,596 | 5/1963 | Gifford | 251—368 XR |

FOREIGN PATENTS 1,282,637   12/1961   France.

ALAN COHAN, *Primary Examiner.*

M. CARY NELSON, WILLIAM F. O'DEA, H. W. WEAKLEY, *Assistant Examiners.*